Patented May 16, 1939

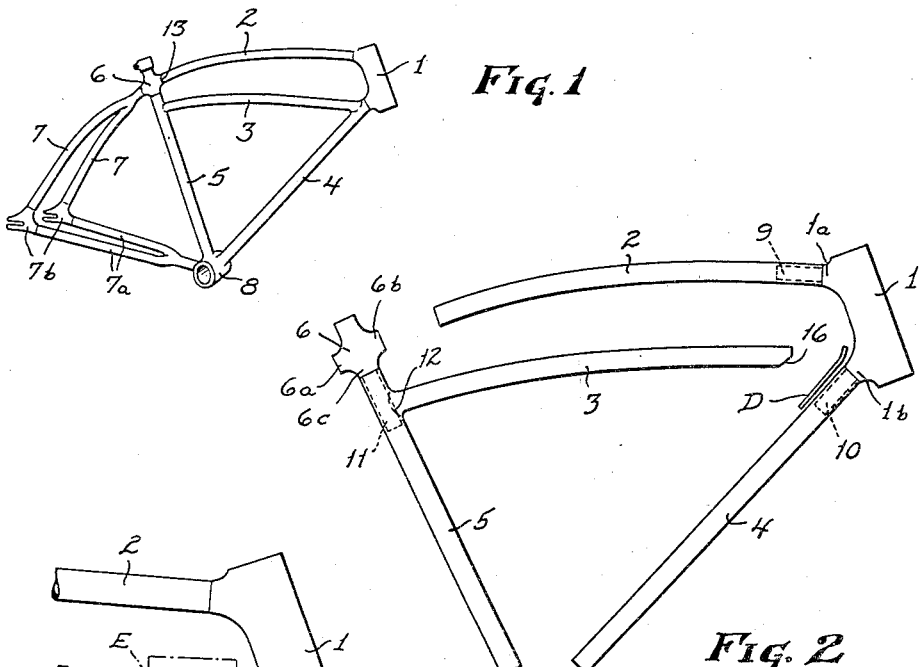
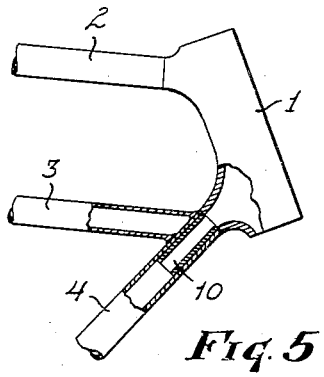
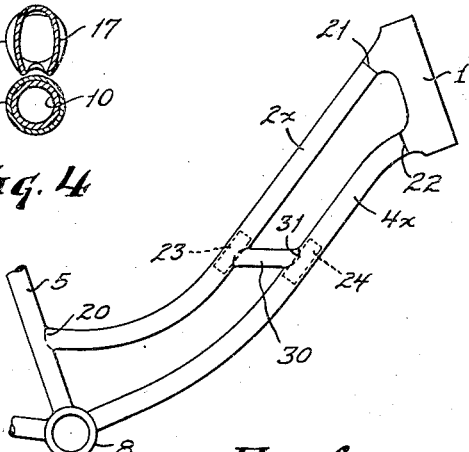
INVENTOR.
SIGURD LOFTFIELD

2,158,075

UNITED STATES PATENT OFFICE 2,158,075

JOINING TUBULAR PARTS

Sigurd Loftfield, Euclid, Ohio, assignor to The Murray-Ohio Manufacturing Company, Cleveland, Ohio, a corporation of Ohio Application September 20, 1937, Serial No. 164,651

3 Claims. (Cl. 29—176)

This invention relates to an improvement in joining tubular parts by butt or resistance electrical welding, and specifically to an improvement in forming a tubular bicycle frame having a cross portion, such as a secondary or lower reach bar. The above indicates the general object.

In the manufacture of bicycle frames, the frame tubes have been joined by electrical resistance welding to the endwise adjacent frame parts. Such welding may be done without presenting any great difficulty whenever the parts to be welded can be shifted freely relative to each other in a direction endwise of the tube. For instance, the mast tube can be welded to the seat post cluster or head, the reach bar (tube) then welded to such cluster, the steering head cluster then welded to the reach, and the lower frame bar (tube) then welded to the steering head cluster. In each step the welding stock can be supplied by the tubes which can move relatively toward the clusters or heads as the stock is fused.

Heretofore, where the frame has employed a secondary (lower) reach bar, this has been assembled into the frame, say as a last operation, either by arc welding or gas welding, for the reason that after the mast, seat post cluster, steering head and lower frame bar are assembled, then notwithstanding that the mast and lower frame bar may be yet unconnected, the parts mentioned form a fairly rigid triangle; and while the supplemental reach bar, which is generally parallel to the upper reach bar possibly could be moved endwise toward one portion of the frame to which it has to be joined (thus permitting effective resistance welding), it could not subsequently be moved endwise toward the other portion to effect such welding. Consequently, so far as I know, no successful attempt has been made heretofore to resistance weld such supplemental bar into place. Similar difficulties are presented by cross bracing tubes as between the reach and lower frame bars of bicycles built for use by women.

A specific object is to provide an improved method of making tubular bicycle frames, partially by resistance welding; said method including an improved order of procedure in attaching the individual pieces together.

Other objects and features will become apparent from the following description relating to the accompanying drawing, which shows the preferred procedure as applied to making bicycle frames. The essential characteristics are summarized in the claims.

Referring briefly to the drawing, Fig. 1 is a perspective view, showing a bicycle frame as a suitable illustration of the problem; Fig. 2 is an exploded view, showing two sub-assemblies, forming parts of such frame prior to effecting a first welding operation in joining the assemblies; Fig. 3 is a fragmentary side elevation, showing the relationship of two of the frame parts preparatory to effecting a second and final welding operation in joining the two sub-assemblies; Fig. 4 is a transverse sectional view, as indicated at 4—4 on Fig. 3; Fig. 5 shows, partially in longitudinal section, the weld between the supplemental reach bar and the lower frame bar, and Fig. 6 is a side elevation showing the forward portion of a different type of frame wherein the present method is applied.

Referring further to the drawing, first to Fig. 1, the various parts of the frame, comprise: a front steering fork supporting head cluster 1; an upper reach bar 2; a supplemental reach bar 3; a lower frame bar 4; a mast 5; a seat post cluster 6; upper and lower rear wheel forks 7 and 7a, respectively, yoke members 7b which receive the rear axle, and a crank hanger 8.

As shown in a prior application (filed as a joint invention of myself and Herman L. Kraeft, Serial No. 119,812, on January 9, 1937, owned by the assignee hereof) such bicycle frame may be made substantially entirely by butt or resistance welding of formed sheet-metal blanks and tubes. In that application the crank hanger 8 and supplemental reach bar 3 are secured as final operations, but neither by resistance or butt welding. In the present application, the order of procedure is altered, particularly with respect to the order of attachment of parts such as 2, 3, 4 and 5, and further use is made of resistance welding, as will be described.

The head portion 1 of the frame may be made in two halves of formed sheet-metal, the assembly of which, (as by butt welding) results in the formation of rearward tubular extensions 1a and 1b. Preferably the "halves" are of fairly heavy sheet-metal in comparison to acceptable tube stock, wherefor the tubes may have inside reinforcing members, also tubular, as indicated at 9 and 10, at the end portions, partly to thicken the end walls where the welding is effected between the tubes and extensions. The reinforce 10 has a more important and specific object and function, which will be described later.

The operation of attaching the tube 2 to the extension 1a may comprise clamping the head part 1 and the tube between suitably recessed welding blocks or clamps, in pairs which are connected respectively to current leads, and moving the tube 2 endwise with respect to the extension 1a while supplying the welding current to the blocks, as is usual. The tube member 4 may be attached in a suitable manner to the head 1 at the extension 1b. No particular order of attachment of said tubes to the head need be observed.

The seat post cluster 6, shown in Figs. 1 and 2, may also comprise a pair of sheet-metal halves, which, when welded together, form a unit, having forwardly and rearwardly disposed extensions, 6a and 6b, and a downward extension 6c. The latter may be attached to the mast tube 5 in a manner such as already described; and it will be noted in Fig. 2 that the upper end of the tube 5 also has a tubular insert 11 to reinforce and build up its section at the end portion. Both the inserts 10 and 11 are of specific importance in respect to securing the supplemental reach bar 3 in position, in accordance herewith, by reinforcing the side walls of tubes 4 and 5 at the welding zones. It may be mentioned that the inserts, such as 10 and 11, may be complete tubes or C-shaped sheet-metal members, in either case being large enough so that they can be firmly seated as by being driven into place. In case such C-shaped sheet-metal members are used, the separations between the ends occupy positions opposite the zones of attachment of the supplemental frame bar 3, to the respective tubes 4 and 5.

It may be noted at this point, incidentally, that before attaching the supplemental reach bar 3 to the mast 5, the rear wheel supporting fork members may already have been attached, and, insofar as the present improvement is concerned, the mast and lower wheel supporting fork members, such as 7a, already attached to the crank hanger. The lower frame bar 4 would not have been attached to the crank hanger, since this would make the operation of resistance welding between the lower reach bar 3 and the mast 5 too difficult or inconvenient.

Attachment of the supplemental reach bar 3 to the mast 5, opposite the inside reinforce 11 at the stage indicated, becomes simply a matter of clamping the rear end portion of the bar 3 and the mast 5 in appropriate welding blocks and bringing the bars 3 and 5 together endwise of the bar 3, while supplying welding current. The reinforce at 11 prevents "burning through" of the side wall of the mast.

The seat post cluster 6 and the bar 2 are now placed in suitable welding clamps, not shown, and brought together endwise of the tube 2, to weld the parts in the relationship shown in Fig. 1, wherein the welding joint is indicated at 13. During this welding it is important, in order to prevent arcing or improper partial welding at the free end of the tube 3, to insulate such free end of the reach bar 3 from the adjacent portions of the head or lower frame bar 4 (whichever it may be disposed to contact), and this may be done by interposing, e. g. between 3 and 4, a sheet of fiber, leather or the like, see D, Fig. 2.

When the bar 2 and seat post cluster are brought together for welding, the free end of the bar 3, is stressed away from the bar 4. This occurs because the bar 3, in effecting the weld at 12, is held in the desired final position, namely, as shown in Fig. 1, and because the necessary welding stock, for welding the parts 3 and 4 together, is carried on the bar 3. Such welding stock is that portion 15 of the tube 3, shown in Fig. 3, diagonally below the broken line L. The lower free end edge portion of the bar 3 at the right Fig. 2 may be bevelled, as at 16, so that when the bars 3 and 4 are finally brought together, there will be considerable initial contact between the two bars. Also, particularly if the tubes 3 and 4 are nearly the same diameter, the free end of the bar 3 is preferably somewhat flattened or made oval in shape, as shown at 17, Fig. 4, in order that in effecting the weld completely around the diagonal extremity of the bar 3 the lateral edges of 3 will not have to be brought nearly so far toward the center of the bar 4 as would be the case if both bars 3 and 4 were cylindrical at the welding region.

The start of the final welding operation on the two sub-assemblies shown in Fig. 2, is shown in Fig. 3. The end portions of the bars 3 and 4 may be clamped between paired blocks such as partially indicated in broken lines at E and E'. The blocks E and E' maintain the bars 3 and 4 in the same plane (being guided in a suitable fixture), as the end of the bar 3 is swung relatively toward the bar 4. The bending strain in the bar 3 is relieved, as the welding is accomplished by fusing of the portion 15 against the reinforced side wall of the bar 4, such fusion removing said portion approximately to the broken line L, Fig. 3. It may be noted that, of necessity, a portion of the current supplied for effecting the weld just described, passes around the loop formed by the members 1, 2, 6, 5 and 3. Such parallel circuit does not impair the weld or do any damage because of the resistance offered by the relatively long path of travel for the current and the short time it takes to flash weld. The final joint is illustrated in Fig. 5, and this is substantially complete all around the diagonally extending end of the bar 3.

The term "butt" welding is used herein in a broad sense only. All the welding above described preferably is done as flash welding, although part or all of the joints may be butt welded in the specific sense of that term.

Securing the ends of the tubes 4, 5 and 7a to the crank hanger forms no part of the present invention. Such may be done by arc or other welding. Fins incident to the various resistance welding operations described are cut off, as by chisels or grinding wheels, at appropriate stages or optionally, as final operations.

Referring to Fig. 6, showing the type of frame usually sold for use by women, it will be noted that the lower frame bar 4x is connected to the head 1 and crank hanger as previously described and that instead of a reach 2, such as previously described, there is provided a diagonally extending reach bar 2x running parallel to the lower bar and joining the mast near the hanger. Joints at 20, 21 and 22 are effected by electrical resistance welding, for instance in the order mentioned; the hanger 8 being secured to 5 and 4x afterward. Here attachment of the strut or brace 30 presents a problem such as that presented by placement and welding of the secondary reach of the construction previously described.

I propose to weld the brace 30 to one of the members 2x or 4x before both connections at 21 and 22 are made; using reinforcing tubes or inserts as at 23 and 24 opposite the region of welding. For instance, 30 could be resistance welded to 2x at any stage, and subsequently, when the bar 4x is welded at 22, arcing, improper welding, current loss, etc., incident to contact between 30 and 4x, is prevented by interposing an insulation sheet between the adjacent but unconnected surfaces of 30 and 4x.

Welding stock for the second joint 31 is furnished by the end portion of the brace. The provision of welding stock as mentioned would tend to keep the bars 2x and 4x spread wider than desirable during welding at 22 but when the head is clamped, the bar 2x may then be flexed so as to maintain the brace with its excess length (welding stock) out of contact with the bar 4x and prevent it from interfering with proper placement of the bar 4x in effecting the weld at 22. Afterward the brace and adjacent portion of the lower bar 4x are brought together and welded substantially as are the bars 3 and 4 of the previously described construction.

Stresses in the frame are substantially neutralized when the welding operations at 31 have been completed. Some current loss takes place as surge, along the bar 4x. This results in raising the temperature of the parts included in the longer circuit, but neither impairs the parts and joints nor renders difficult welding of the brace to the lower bar at 31.

I claim:

1. In making tubular cycle frames, the method comprising welding tubular members into a loop which is disunited at one region and maintained under bending stress by abutment of a diagonally faced portion of one of the members with a side wall of another of the members at such region, and closing the loop by electrically welding the disunited surfaces, meanwhile bringing the members adjacent said surfaces toward each other in a direction tending to relieve said stress in the loop.

2. In making cycle frames having double reach bars, the procedure comprising welding the front ends of an upper reach bar and a lower frame bar to a suitable head in angular relationship, welding the rear end of a lower reach bar to a mast or mast assembly adapted to support a seat, then, by electrical resistance welding, joining the rear end of the upper reach bar to said mast or assembly while maintaining the forward end of the lower reach bar out of contact with the frame members, and then, by electrical resistance welding, joining such forward end of the lower reach bar to the side wall of the lower frame bar.

3. In making cycle frames the method comprising welding a reach bar and a lower forward frame bar to a front-fork-supporting head, welding a lower reach bar to a seat supporting mast, and then by electrical resistance welding attaching the free ends of such reach bars to such head and mast respectively, one after the other as separate operations.

SIGURD LOFTFIELD.